United States Patent [19]
Lahrman

[11] Patent Number: 5,174,584
[45] Date of Patent: Dec. 29, 1992

[54] FLUID BEARING FACE SEAL FOR GAS TURBINE ENGINES

[75] Inventor: Kenneth A. Lahrman, Maineville, Ohio

[73] Assignee: General Electric Company, Cincinnati, Ohio

[21] Appl. No.: 729,971

[22] Filed: Jul. 15, 1991

[51] Int. Cl.⁵ .............................................. F16J 15/16
[52] U.S. Cl. .................................. 277/74; 277/81 R; 277/85; 277/96.1
[58] Field of Search .................... 277/74, 81 R, 82, 83, 277/85, 86, 96, 96.1, 96.2, 71

[56] References Cited

U.S. PATENT DOCUMENTS

| | | | |
|---|---|---|---|
| 2,365,046 | 12/1944 | Bottomley | 277/85 |
| 2,814,511 | 11/1957 | Truax | 277/81 |
| 2,843,404 | 7/1958 | Janetz | 277/85 |
| 2,948,555 | 8/1960 | Wright | 286/11.13 |
| 3,119,623 | 1/1964 | Shevchenko | 277/3 |
| 3,360,272 | 12/1967 | Blom et al. | 277/3 |
| 3,383,033 | 5/1968 | Moore | 230/132 |
| 3,499,653 | 3/1970 | Gardner | 277/27 |
| 3,572,727 | 3/1971 | Greiner | 277/85 |
| 3,608,910 | 9/1971 | Tyler | 277/24 |
| 3,652,183 | 3/1972 | Pottharst, Jr. | 277/96.2 |
| 3,804,424 | 4/1974 | Gardner | 277/74 |
| 3,953,038 | 4/1976 | Ludwig | 277/74 |
| 4,082,296 | 4/1978 | Stein | 277/3 |
| 4,114,900 | 9/1978 | Wiese | 277/27 |
| 4,161,317 | 7/1979 | Sakamaki | 277/25 |
| 4,199,152 | 4/1980 | Catterfeld | 277/3 |
| 4,204,689 | 5/1980 | Johansson | 277/27 |
| 4,211,424 | 7/1980 | Stein | 277/25 |
| 4,212,475 | 7/1980 | Sedy | 277/96.1 |
| 4,313,608 | 2/1982 | Scott | 277/27 |
| 4,330,133 | 5/1982 | Palfreyman et al. | 277/26 |
| 4,405,134 | 9/1983 | Sargent et al. | 277/3 |
| 4,406,459 | 9/1983 | Davis et al. | 277/74 |
| 4,406,466 | 9/1983 | Geary, Jr. | 277/134 |
| 4,415,165 | 11/1983 | Martini | 277/27 |
| 4,511,149 | 4/1985 | Wiese | 277/3 |
| 4,552,368 | 11/1985 | Wallace | 277/27 |
| 4,553,721 | 6/1984 | Angus et al. | 277/3 |
| 4,613,141 | 9/1986 | Heinen | 277/27 |
| 4,669,735 | 6/1987 | Sundberg et al. | 277/1 |
| 4,804,194 | 2/1989 | Hufford et al. | 277/3 |
| 4,890,849 | 1/1990 | Eason | 277/27 |
| 4,948,151 | 8/1990 | Janzen et al. | 277/27 |

FOREIGN PATENT DOCUMENTS 0920892  3/1963  United Kingdom ............... 277/96.1

OTHER PUBLICATIONS

Optimum Surface Profile for the Enclosed Pocket Hydrodynamic Gas Thrust Bearing—Chow et al.—Transactions of the ASME, Apr. 1970, pp. 318–324.
Development of Mainshaft Seals for Advanced Air Breathing Propulsion Systems: Phase II–V. P. Povinelli et al., Final Report—NASA Contract NAS3-7609, Jun. 23, 1970.
Design Study of Shaft Face Seal with Self-Acting Lift Augmentation—Ludwig et al., NASA Technical Note D-6563 Dec. 1971.

Primary Examiner—William A. Cuchlinski, Jr.
Assistant Examiner—Daniel G. DePumpo
Attorney, Agent, or Firm—Jerome C. Squillaro; John R. Rafter

[57] ABSTRACT

To restrict fluid flow between a high pressure working gas region and a low pressure lubricating oil sump in a gas turbine engine, a fluid bearing face seal includes a rotating mating ring confronted by a non-rotating carbon sealing ring with a face machined to provide an annular array of alternating lands and liftoff force-generating hydrodynamic lift pads, each comprising a three-step stairwell radially inwardly and outwardly bound by rails flush with the lands. An improved secondary seal includes a carbon mating ring to reduce seating drag forces on a piston ring biased into sealing engagement with a sealing ring carrier and a plurality of fluid orifices for pressure moment balancing the piston ring to the working gas pressure. To generate additional liftoff forces at low mating ring angularly velocities, the sealing ring face may also include an annular hydrostatic lift pad.

14 Claims, 4 Drawing Sheets

FLUID BEARING FACE SEAL FOR GAS TURBINE ENGINES

The present invention relates to fluid seals and particularly to an improved gas bearing face seal for effectively restricting fluid flow between rotating and stationary members of a gas turbine engine.

BACKGROUND OF THE INVENTION

Gas turbine engines have typically utilized labyrinth seals to minimize leakage fluid flow between rotating and non-rotating members. Labyrinth seals are also utilized to provide barriers against counterflows and thus intermixing of different fluids, such as high temperature working gas and lubricating oil, through gaps between rotating and non-rotating engine members. Labyrinth seals function to throttle fluid flow past a succession of annular constrictions provided between a series of circumferential teeth formed on a engine member rotating in closely spaced relation to a smooth mating surface carried by a stationary engine member. Seals of the labyrinth type have the advantages of simplicity and long operating life, and are reasonably effective fluid seals as long as the pressure differential across the seal is reasonably low.

Current advanced gas turbine engine designs to increase thrust and fuel efficiency subject fluid seals to a far more hostile environment in terms of greater pressure differentials, higher temperatures, larger seal diameters and increased velocity of the rotating engine member. Seal clearances must then be increased to account for manufacturing tolerances, possible eccentricity of the members, and material growth due to temperature and centrifugal loading. Excessive fluid leakage then occurs in a labyrinth seal to the detriment of engine performance and fuel economy. If the seal's function is to restrict leakage of high temperature working gas into engine bearing compartments or sumps, any lubricating oil in or near the seal can produce coke build-up which further degrades seal effectiveness.

To avoid the deficiencies of labyrinth seals encountered in advanced engine designs, gas bearing face seals are being substituted. An example of this type of fluid seal is disclosed in commonly assigned Moore U.S. Pat. No. 3,383,033. In a fluid seal of this type, a bearing in the form of a gas film is developed between the faces of a rotating mating ring and a non-rotating sealing ring to actively control the dimension of the sealing gap. The sealing ring is mounted by a carrier which, in turn, is mounted to a stationary housing for limited gap-varying movement relative to the mating ring face. To restrict fluid leakage between the carrier and the housing, a secondary fluid seal must be utilized. While significantly more effective in reducing fluid leakage than labyrinth seals, gas bearing face seals must be manufactured to exacting tolerances to ensure precise parallelism between mating and sealing ring face surfaces over wide ranges of temperature, pressure and speed. Also, measures must be taken to ensure a continuing force moment balance on the secondary seal to prevent unseating and consequent leakage. Gas bearing face seals are more effective in preventing leakage than labyrinth seals, since the gas film bearing can be extremely thin, e.g., less than 0.5 mils. However, with such close spacing between the mating and sealing ring face surfaces, intermittent contact therebetween can occur at low speeds, high pressure drops, or increased temperatures. Such contact results in wearing of the face surfaces with consequent reduced sealing effectiveness and service life.

SUMMARY OF THE INVENTION

It is accordingly an objective of the present invention to provide an improved fluid bearing face seal which is effective to restrict fluid leakage over a long operating life. The improved fluid seal retains its effectiveness in an environment of elevated pressure drops and high temperatures. Moreover, the improved seal can be implemented in large diameters and can operate at higher velocities to accommodate scaled up gas turbine engine designs.

To this end, the gas bearing face seal of the present invention includes a mating ring mounted on a rotating part, such as the mainshaft of a gas turbine engine, and a non-rotating sealing ring to present opposed radial sealing face surfaces between which a gas bearing in the form of a thin fluid film is developed. The sealing ring, preferably formed of carbon, is mounted by a carrier which, in turn, is mounted by a stationary member, such as an engine housing member. The carrier mounting to the housing utilizes a triangular arrangement of splines or keys to accommodate limited axial motion of the carrier while maintaining the carrier and sealing ring concentric with the rotating mating ring. A circumferential array of springs, acting between the carrier and housing, balance the gas bearing film pressure to actively control the ga dimension between the sealing faces of the mating and sealing rings. A pressure moment balanced secondary seal is positioned between the carrier and housing to restrict fluid leakage therepast.

The face surface of the sealing ring is formed with an annular seal dam to the side of the seal facing a low pressure region, such as an oil sump, and a uniformly distributed annular array of hydrodynamic lift pads to the side of the seal facing a high pressure region, which may contain a working gas at elevated temperatures. In accordance with a feature of the present invention, the lift pads are of a multiple stepped and railed configuration to provide greater lift forces and enhanced operating life characteristics. As the shallowest steps of the lift pads are worn away by intermittent contact with the mating ring face, the deeper steps remain intact to generate the requisite lift forces to separate the sealing face surfaces and admit the gas bearing film.

In an alternative embodiment of the invention, the face surface of the sealing ring is also formed with a hydrostatic lift pad to the low pressure side of the seal dam. High pressure fluid is directed to the hydrostatic lift pad to generate lift forces which are particularly effective at slow speeds to maintain separation of the sealing face surfaces as the speed-dependent lift forces of the hydrodynamic pads fall off.

To improve the sealing characteristics of the secondary seal, a secondary seal piston ring and a mating ring of high lubricity material, such as carbon, are mounted in juxtaposition by the housing. The mating ring beneficially serves to reduce seating drag forces on the secondary seal ring as it is spring-biased into sealing engagement with the carrier. Moreover, an arrangement of orifices ensures that the radial pressure forces of the working gas acting on the secondary seal piston ring are substantially pressure moment balanced to maintain proper sealing against the carrier.

The invention accordingly comprises the features of construction, combination of elements and arrangement of parts, all as detailed hereinafter, and the scope of the invention will be indicated in the claims.

BRIEF DESCRIPTION OF THE DRAWINGS

For a full understanding of the nature and objectives of the present invention, reference may be had to the following Detailed Description taken in conjunction with the accompanying drawings, in which.

Like reference numerals refer to corresponding parts throughout the several views of the drawings.

DETAILED DESCRIPTION

Figure 1:
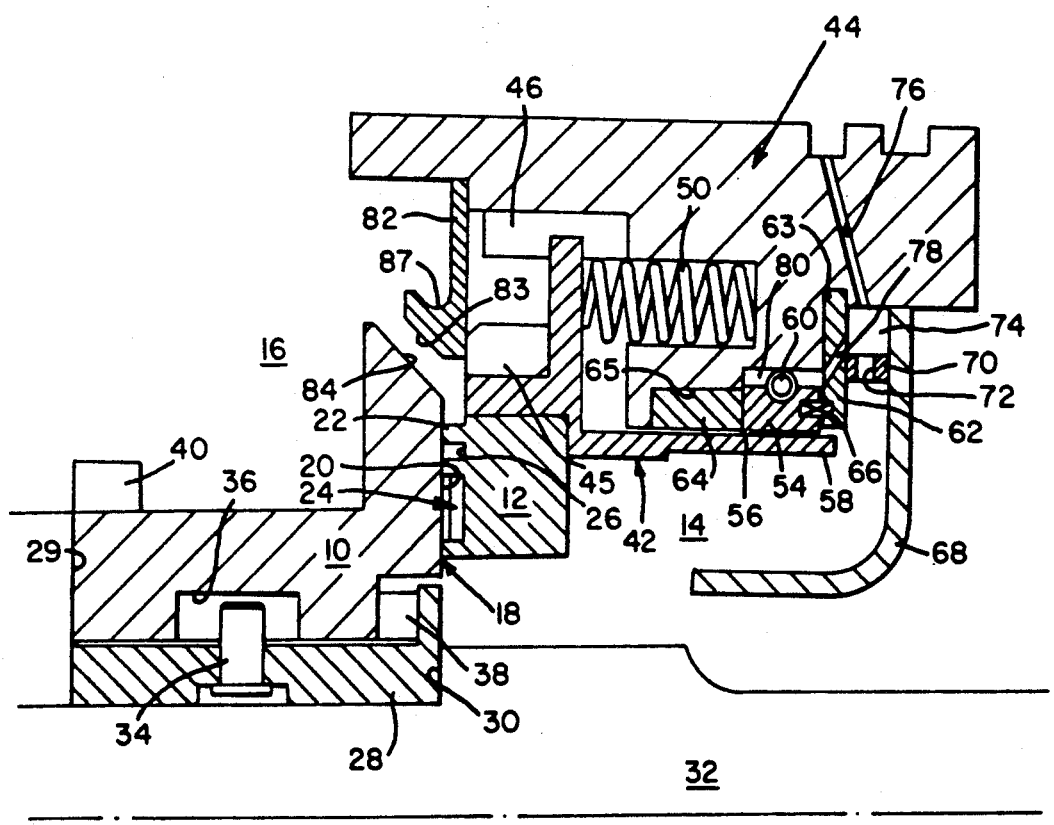
FIG. 1 is an axial cross sectional view of a fluid bearing face seal constructed in accordance with an embodiment of the present invention.

The fluid bearing face seal of the present invention includes, as seen in FIG. 1, a mating ring, generally indicated at 10, and a sealing ring, generally indicated at 12, for restricting fluid flow between a high pressure fluid region 14 and a low pressure fluid region 16. The high pressure region may contain gas turbine engine working gas at temperatures as high as 850° F., while the low pressure region may be a bearing sump containing lubricating oil. Pressure differentials may be as high as 150 psi. A fluid sealing gap 18 is defined by a planar, radial face 20 of the mating ring and a confronting face of the sealing ring, which is configured to provide an annular seal dam 22 and a plurality of uniformly, circumferentially distributed hydrodynamic lift pads, generally indicated at 24. An annular channel 26 separates the seal dam from the annular array of lift pads.

A collar 28 is clamped between axially spaced, radial shoulders 29 and 30 on a shaft 32, which may be the mainshaft of a gas turbine engine. Radial drive pins, one seen at 34, are affixed to the collar for projection into axially extending slots 36 in the mating ring bore, and a wave spring 38 applies requisite leftward axial loading to seat the mating ring against shoulder 29. The assembly of the mating ring, collar and wave spring thus rotates as a unit with shaft 32. The geometry and dimensions of the mating ring are such that it is axially and radially balanced by the fluid pressures in regions 14 and 16, as well as balanced under centrifugal loading. Discrete lugs 40 may be machined on the mating ring as a centrifugal load balancing free weights. These precautions ensure that the mating ring remains concentric with shaft 28, and thus its seal face 20 lies continuously in a radial plane.

Figure 4:
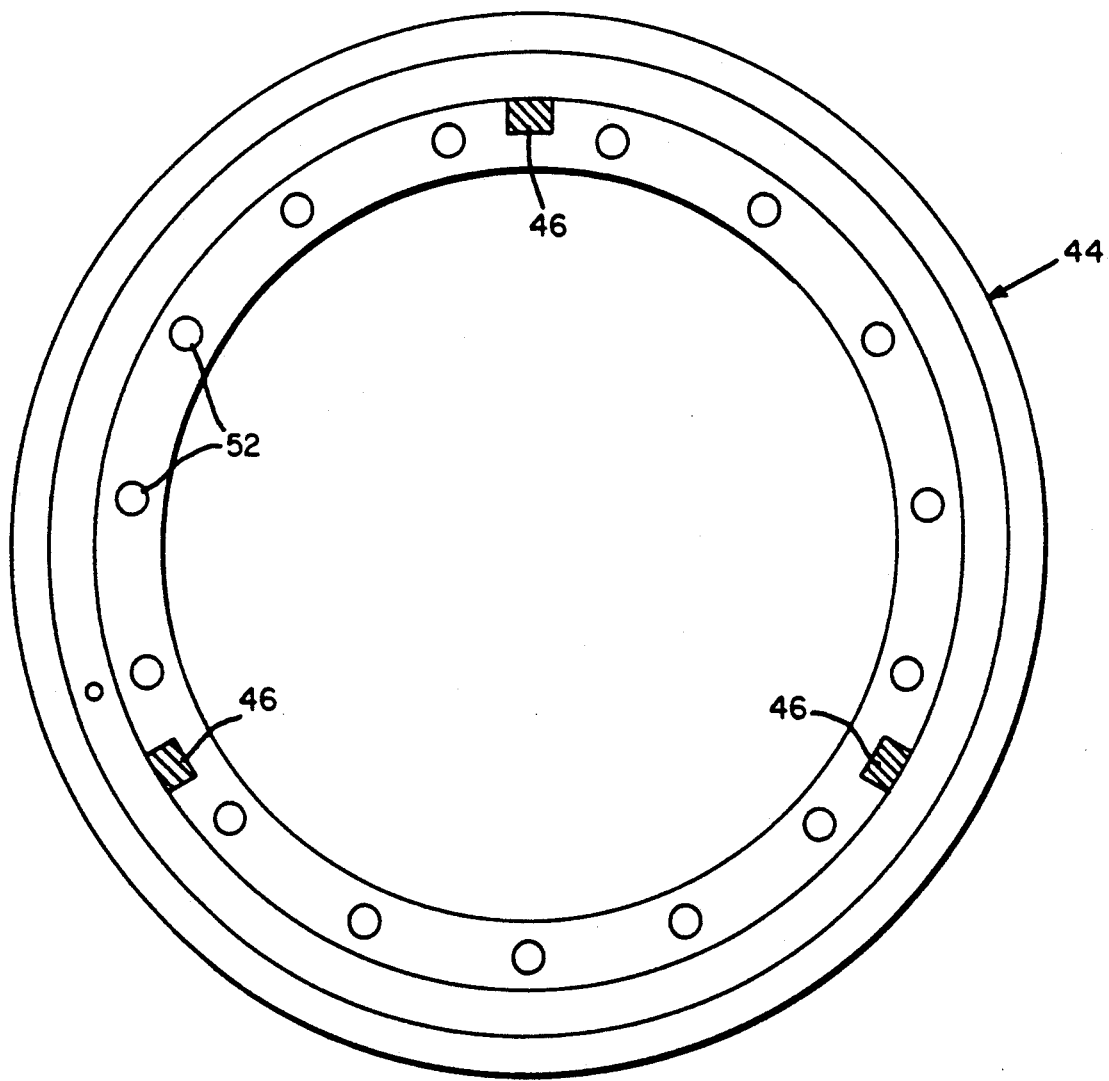
FIG. 4 is an axial front view of the annular housing seen in FIG. 1.

Sealing ring 12, preferably formed of carbon, is shrink-fitted to a carrier, generally indicated at 42, which is mounted by a housing, generally indicated at 44. A shrink band 45 is shrink-fitted about the carrier so that the combination of the sealing ring, carrier and shrink band, their material properties and relative locations preserve parallelism between the seal faces during operation. To maintain the carrier mounting concentric with the shaft and to additionally preserve parallelism between the seal faces, the housing carries a set of three equiangularly spaced anti-rotation blocks or keys 46 (FIG. 4) which are slidingly received in keyway notches, one seen at 48 in FIG. 2. A distributed annular array of closing springs 50, captured in blind holes 52 in housing 44 (FIG. 4), bias the carrier and sealing ring in the direction to close gap 18, i.e., to bear the sealing ring face against the mating ring face 20, as will occur during engine startup and shutdown.

Since the carrier moves axially relative to the housing, a secondary seal 54, in the form of a piston ring, is provided with a seal dam 56 which bears against the peripheral surface of an axially extending carrier sleeve 58 under the seating force of a garter spring 60. The secondary seal, also of a carbon material, is axially captured between a lock ring 62, accommodated in an annular housing notch 63, and a carbon mating ring 64 in shrink-fit engagement with a housing shoulder 65. A distributed annular array of compression springs 66, backed by the lock ring, bias the secondary seal axially against mating ring 64. The inclusion of this carbon mating ring of high lubricity beneficially serves to reduce seating drag forces on the secondary seal. A heat shield 68, affixed to the housing, extends radially and then axially into the high pressure region 14 to provide a barrier protecting the seal during thermal transients and also to shield the seal from possible damage during engine assembly and disassembly.

An annular flange 70, positioned between lock ring 62 and the radial portion of heat shield 68, is perforated to provide an annular array of large orifices 72 accommodating gas flow to pressurize an annular chamber 74 to substantially the high pressure of region 14. A plurality of overboard drain holes 76 are drilled through the housing into communication with chamber 74. In addition a plurality of large orifices 78 are drilled through lock ring 62 to pressurize a cavity 80 between the secondary seal and the housing. By virtue of this arrangement, the secondary seal is pressure moment balanced to the high pressure gas in region 14, and thus proper seating of the secondary seal is ensured. Also, the orifices 72 and drain holes 76 are effective in discharging any oil that leaks past the secondary seal and any oil fumes that leak past the primary seal, i.e., the gas bearing face seal.

Also shown in FIG. 1 is an oil deflector 82 which is mounted by the housing in a position to present an annular surface 83 in closely spaced, parallel relation with an annular surface 84 of mating ring 10 to define an oil passage. With rotation of the mating ring, a shear force vector slings the oil back into the sump to minimize oil contact with hot surfaces of the seal elements. Coke buildup is thus largely avoided. The oil deflector also provides a trough 87 which collects oil in its upper portion, which runs off from its lower portion.

Figure 2:
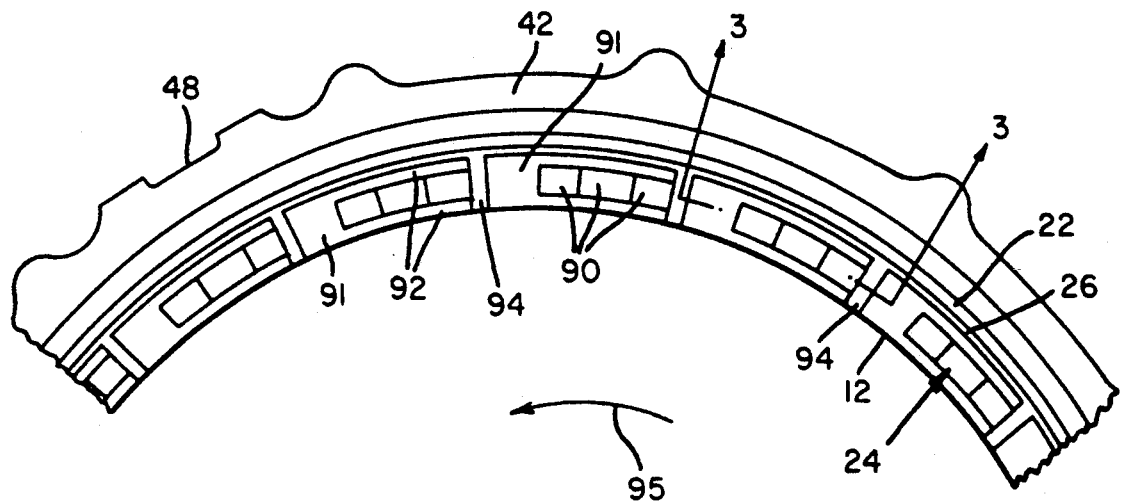
FIG. 2 is an axial front view of an arcuate portion of the sealing ring and carrier assembly seen in FIG. 1.
Figure 3:
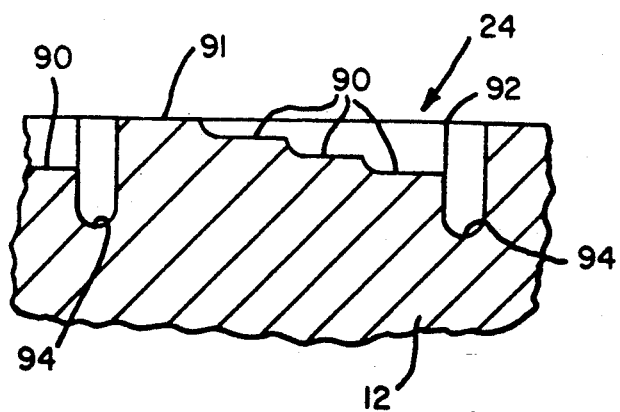
FIG. 3 is a sectional view taken along line 3—3 of FIG. 2.

Turning to FIGS. 2 and 3, each hydrodynamic lift pad 24 of the present invention comprises a circumferentially distributed series of at least two and preferably three steps 90 of successively increasing depth beneath lands 91 disposed between the lift pads. The steps are radially inwardly and outwardly bounded by rails 92, which extend between and are flush with the lands. Thus, the rails and annular seal dam 22 provide the face surfaces of sealing ring 14 that immediately confront the planar surface of mating ring face 20. Intermediate the deepest step of each lift pad and the adjacent land is a radially extending feed slot 94 through which high pressure gas can flow from region 14 to pressurize annular channel 26 intermediate the lift pads and the seal dam. Gas also fills the stairwell containing steps 92, and, with rotation of the mating ring in the direction of arrow 95 of FIG. 2, the shearing action on the gas increases the gas pressure in the stairwells to generate liftoff forces in opposition to the closing spring forces and the axial hydrostatic forces of the gas acting on the carrier and sealing ring. The faces of the mating and sealing rings separate to create sealing gap 18 which fills with gas to provide the gas bearing film between the seal faces. If the sealing gap tends to close, the pressure of the bearing film increases to prevent rubbing contact between the seal faces. Any tendency for the sealing gap to widen is countered by a reduction in bearing film pressure. The sealing gap dimension and thus the bearing film thickness is self-regulating to provide an effective fluid seal and to preclude interfacial rubbing contact except during engine startup and shutdown.

In addition to providing the requisite lift-off forces, the railed, multistep lift pad geometry of the present invention provides a gas bearing face seal having a long service life. As lands 91 and rails 92 are worn down over time as the result of unavoidable intermittent contact with the mating ring face 20 and the outermost or shallowest steps 90 of the lift pads are erased, the two remaining deeper steps are still effective to develop requisite lift-off forces. Thus, it is only when the deeper steps are substantially worn away that the gas bearing force seal must be replaced.

Figure 5:
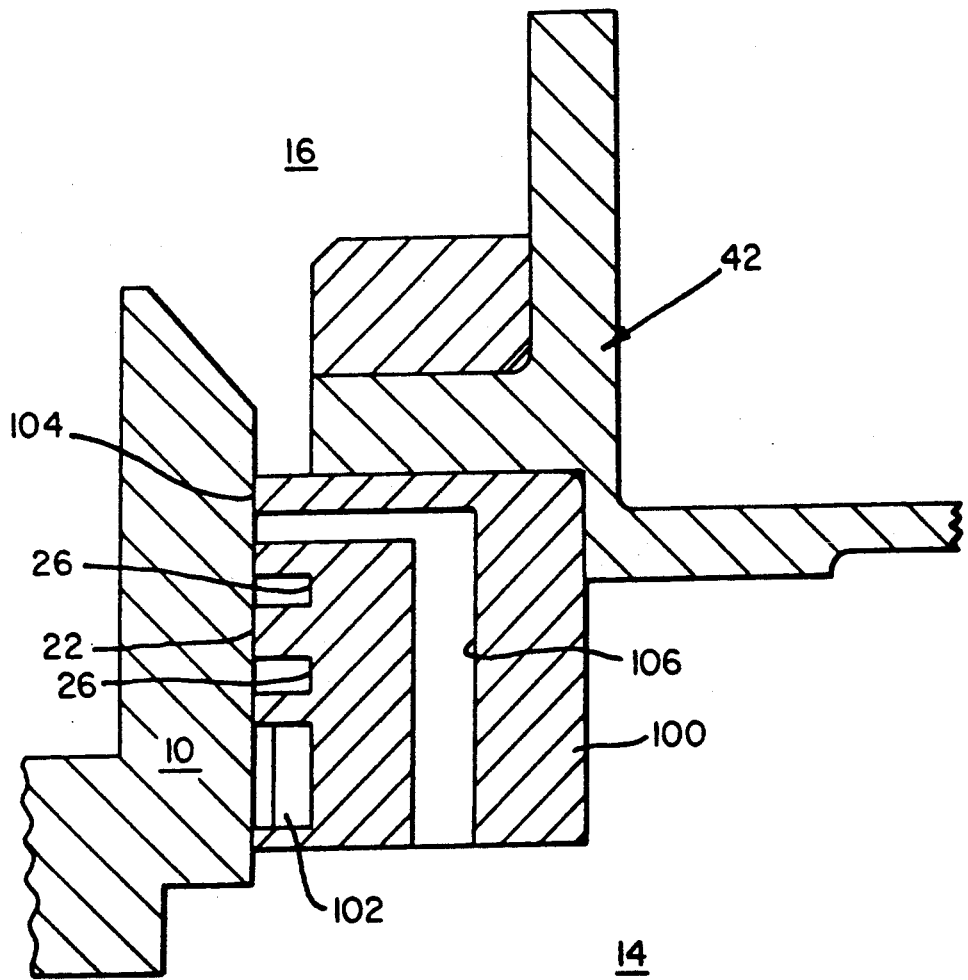
FIG. 5 is a fragmentary axial cross sectional view of a fluid bearing face seal constructed in accordance with an alternative embodiment of the invention.

In the embodiment of the invention seen in FIG. 5, carrier 42 mounts a carbon sealing ring 100 having its face surface machined to provide an annular array of hydrodynamic pads 102 adjacent high fluid pressure region 14 and a annular hydrostatic pad 104 adjacent low fluid pressure region 16. The hydrostatic pad and the hydrodynamic pads are radially separated by an annular seal dam 22 and flanking annular channels 26. An annular array of passages 106 communicates high pressure fluid from region 14 to the face of the hydrostatic pad where it is discharged against the confronting sealing face of mating ring 10 to generate lift forces. The hydrodynamic lift pads may be of a convention configuration or the multiple stepped and railed configuration seen in FIGS. 2 and 3. Since the lift forces generated by the hydrodynamic pads are velocity dependent, i.e., vary in direct relation to the angular velocity of the mating ring, and the lift forces generated by the hydrostatic pad are pressure dependent, i.e. vary in direct relation to the fluid pressure of region 14, the hydrodynamic and hydrostatic pad combination of FIG. 5 can provide requisite lift forces to separate the sealing face surfaces to accommodate a fluid bearing film under a wider range of operating conditions from high velocity-low pressure to low velocity-high pressure. Consequently, the extent of wearing engagement of the sealing faces is reduced, and seal life is thus prolonged.

It is seen from the foregoing that the objectives of the invention set forth above including those made apparent from the Detailed Description, are efficiently attained, and, since certain changes may be made in the construction set forth without departing from the scope of the invention, it is intended that matters of detail be taken as illustrative and not in a limiting sense.

Having described the invention, what is claimed as new and desired to secure by Letters Patent is:

1. A fluid bearing face seal for restricting fluid flow between fluid regions of differing pressures in a gas turbine engine, said seal comprising, in combination:
    A. a non-rotating housing 44 member:
    B. a mating ring 10 mounted by a rotating shaft of the engine, said mating ring having a first seal face:
    C. a carrier 42 supported by said housing member in concentric relation with said mating ring for limited movement relative to said first seal face:
    D. a carbon sealing ring 12 for withstanding pressure differentials of at least 150 psi mounted by said carrier and having a second seal face confronting said first seal face to define a seal gap therebetween during operation of the turbine, said second seal face having a distributed annular array of lift pads formed therein, each said lift pad including a stairwell having at least two steps radially bounded by a pair of rails; and
    E. closing spring means acting in opposition to liftoff forces generated by said lift pads and the gas bearing film pressure existing between said first and second seal faces during rotation of said mating ring to actively control the width of said seal gap.
    F. a carbon secondary seal for withstanding pressure differentials of at least 150 psi and for restricting fluid flow between said housing member and said carrier, said secondary seal including a carbon piston ring spring biased into seating engagement with a sleeve portion of said carrier and a carbon high lubricity ring mounted in juxtaposition with said piston ring by said housing to reduce seating drag forces on said piston ring.

2. The fluid bearing face seal defined in claim 1, which further includes fluid orifices for communicating the fluid pressure of one of the fluid pressure regions to said piston ring such as to balance fluid pressure moments acting thereon.

3. The fluid bearing face seal defined in claim 1, wherein said second seal face further includes an annular seal dam having an outer surface flush with said lift pad rails and an annular channel separating said seal dam and said lift pads.

4. The fluid bearing face seal defined in claim 3, wherein said second seal face further includes feed slots intersecting the bottoms of said lift pad stairwells for directing fluid from one of the regions into said stairwells and said channel 5. The fluid bearing face seal defined in claim 4, wherein each said lift pad includes at least three steps.

6. The fluid bearing face seal defined in claim 4, wherein said first and second seal faces are radially oriented, said carrier is mounted by said housing member for axial motion during active control of said seal gap width, and said piston ring includes a raised seal dam in seating engagement with said carrier portion extending axially in the working gas region, said secondary seal further including a retaining ring mounted by said housing in radially lapping relation with said piston ring, and springs backed by said retaining ring for axially biasing said piston ring into engagement with said high lubricity ring.

7. The fluid bearing face seal defined in claim 6, which further includes means for pressure moment balancing said piston ring, said means includes a chamber in fluid communication with the working gas region via a plurality of first orifices such that said chamber is pressurized to the working gas pressure, at least one overboard drain hole extending through said housing member into communication with said chamber, and a plurality of second orifices in said retaining ring for pressurizing from said chamber a cavity provided intermediate said housing member and the radially outer side of said piston ring.

8. A fluid bearing face seal for restricting fluid flow between fluid regions of relatively high and low pressures in a gas turbine engine, said seal comprising, in combination:
   A. a non-rotating housing member;
   B. a mating ring mounted by a rotating shaft of the engine, said mating ring having a first seal face;
   C. a carrier supported by said housing member in concentric relation with said mating ring for limited movement relative to said first seal face;
   D. a carbon sealing ring mounted by said carrier and having a second seal face confronting said first seal face to define a seal gap therebetween during operation of the turbine said second seal face having a distributed annular array of hydrodynamic lift pads formed therein adjacent the high fluid pressure region and an annular hydrostatic lift pad adjacent the low fluid pressure region; and
   E. closing spring means acting in opposition to liftoff forces generated by said hydrodynamic and hydrostatic lift pads and the gas bearing film pressure existing between said first and second seal faces during rotation of said mating ring to actively control the width of said seal gap.
   F. a carbon secondary seal for withstanding pressure differentials of at least 150 psi and for restricting fluid flow between said housing member and said carrier, said secondary seal including a carbon piston ring spring biased into seating engagement with a sleeve portion of said carrier and a carrier high lubricity ring mounted in juxtaposition with said piston ring by said housing to reduce seating drag forces on said piston ring.

9. The fluid bearing seal defined in claim 8, wherein said second seal face further includes an annular seal dam radially between said hydrostatic lift pad and said annular array of hydrodynamic lift pads.

10. The fluid bearing seal defined in claim 9, wherein said second seal face further includes separate annular channels radially separating said seal dam from said hydrostatic lift pad and said annular array of hydrodynamic lift pads.

11. The fluid bearing seal defined in claim 10, wherein said hydrostatic lift pad further includes a plurality of passages formed in said sealing ring for discharging fluid from the high pressure region against said first seal face to generate liftoff forces.

12. The fluid bearing face seal defined in claim 10, wherein said first and second seal faces are radially oriented, said carrier is mounted by said housing member for axial motion during active control of said seal gap width, and said piston ring includes a raised seal dam in seating engagement with said housing sleeve portion extending axially in the high pressure region, said secondary seal further including a retaining ring mounted by said housing in radially lapping relation with said piston ring, and springs backed by said retaining ring for axially biasing said piston ring into engagement with said high lubricity ring.

13. The fluid bearing face seal defined in claim 12, which further includes means for pressure moment balancing said piston ring, said means includes a chamber in fluid communication with the high pressure region via a plurality of first orifices such that said chamber is pressurized to the pressure of the high pressure region, at least one overboard drain hole extending through said housing member into communication with said chamber, and a plurality of second orifices in said retaining ring for pressurizing from said chamber a cavity provided intermediate said housing member and the radially outer side of said piston ring.

14. The fluid bearing seal defined in claim 13, wherein said second seal face further includes feed slots intersecting the bottoms of said hydrodynamic lift pad stairwells for directing high pressure fluid into said stairwells and the one of said channels immediately radially beyond, and separate lands disposed between adjacent pairs of said hydrodynamic lift pads, the outer surface of said lands being flush with said rails and said seal dam outer surface.

* * * * *